(12) United States Patent
Harrison (10) Patent No.: US 10,330,363 B2
(45) Date of Patent: Jun. 25, 2019

(54) LUBRICANT SEPARATOR FOR A HEATING, VENTILATION, AND AIR CONDITIONING SYSTEM

(71) Applicant: TRANE INTERNATIONAL INC., Davidson, NC (US)

(72) Inventor: Mark W. Harrison, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 181 days.

(21) Appl. No.: 15/426,237

(22) Filed: Feb. 7, 2017

(65) Prior Publication Data

US 2017/0227268 A1    Aug. 10, 2017

Related U.S. Application Data

(60) Provisional application No. 62/292,691, filed on Feb. 8, 2016.

(51) Int. Cl.

| | |
|---|---|
| *F25B 43/02* | (2006.01) |
| *F16N 19/00* | (2006.01) |
| *F16N 31/02* | (2006.01) |
| *F16N 21/00* | (2006.01) |
| *F25B 1/10* | (2006.01) |
| *F25B 1/053* | (2006.01) |

(52) U.S. Cl.
CPC .............. *F25B 43/02* (2013.01); *F16N 19/00* (2013.01); *F16N 21/00* (2013.01); *F16N 31/02* (2013.01); *F25B 1/053* (2013.01); *F25B 1/10* (2013.01)

(58) Field of Classification Search
CPC .. F25B 43/02; F25B 1/10; F25B 1/053; F16N 19/00; F16N 31/02; F16N 21/00

USPC .......................................................... 62/470
See application file for complete search history.

(56) References Cited

U.S. PATENT DOCUMENTS

| | | | |
|---|---|---|---|
| 6,537,458 B1 | 3/2003 | Polderman et al. | |
| 7,004,988 B2 | 2/2006 | Letzel et al. | |
| 7,374,664 B2 | 5/2008 | Powers | |

(Continued)

FOREIGN PATENT DOCUMENTS

| | | |
|---|---|---|
| DE | 102007003436 | 8/2007 |
| DE | 102006049195 | 4/2008 |

(Continued)

*Primary Examiner* — Frantz F Jules
*Assistant Examiner* — Steve S Tanenbaum
(74) *Attorney, Agent, or Firm* — Hamre, Schumann, Mueller & Larson, P.C.

(57) ABSTRACT

A lubricant separator is disclosed. The lubricant separator can cause lubricant which is entrained with a heat transfer fluid (e.g., a lubricant—heat transfer fluid mixture) to coalesce and fall (e.g., via gravity) into a bottom portion of a lubricant tank assembly. The lubricant separator can also reduce a velocity of the lubricant—heat transfer fluid mixture as it enters the lubricant tank assembly. The velocity reduction can, for example, reduce an amount of splashing of the lubricant that occurs as the lubricant—heat transfer fluid mixture enters the lubricant tank assembly. The velocity reduction can also, for example, be relatively more conducive to lubricant droplets falling into the bottom portion of the lubricant tank assembly as the flow of the heat transfer fluid is provided to a heat transfer fluid return conduit of the lubricant tank assembly.

19 Claims, 9 Drawing Sheets

(56) References Cited

U.S. PATENT DOCUMENTS

| | | | |
|---|---|---|---|
| 7,396,449 B2 | 7/2008 | Powers et al. | |
| 7,488,373 B2 | 2/2009 | Haland et al. | |
| 7,550,642 B2 | 6/2009 | Powers | |
| 7,594,942 B2 | 9/2009 | Polderman | |
| 7,858,834 B2 | 12/2010 | Powers et al. | |
| 8,590,339 B2 | 11/2013 | Pek | |
| 8,657,896 B2 * | 2/2014 | Gouy et al. | |
| 2005/0060970 A1 * | 3/2005 | Polderman | B01D 45/08 55/320 |
| 2008/0011550 A1 * | 1/2008 | Dunn | F25B 43/02 184/6.23 |
| 2008/0066492 A1 | 3/2008 | Buijs et al. | |
| 2010/0005721 A1 | 1/2010 | Houtekamer et al. | |
| 2010/0107687 A1 | 5/2010 | Andrian et al. | |
| 2010/0293996 A1 | 11/2010 | Van Aken | |
| 2011/0154856 A1 | 6/2011 | Andrian et al. | |
| 2011/0192190 A1 | 8/2011 | Andrian et al. | |
| 2011/0192192 A1 | 8/2011 | Andrian et al. | |
| 2013/0247607 A1 * | 9/2013 | Love | F25B 31/002 62/470 |

FOREIGN PATENT DOCUMENTS

| | | |
|---|---|---|
| KR | 20130009053 | 1/2013 |
| WO | 2005058503 | 6/2005 |
| WO | 2010052299 | 5/2010 |
| WO | 2010055153 | 5/2010 |
| WO | 2014067958 | 5/2014 |

* cited by examiner

LUBRICANT SEPARATOR FOR A HEATING, VENTILATION, AND AIR CONDITIONING SYSTEM

FIELD

This disclosure is directed to lubricant separation in a heat transfer fluid (e.g., refrigerant) system. More specifically, the disclosure is directed to a device for separating lubricant from a heat transfer fluid in a heat transfer fluid system such as, but not limited to, a vapor compression system.

BACKGROUND

A unit for a heating, ventilation, and air conditioning (HVAC) system, such as, but not limited to, a chiller unit, can include a lubricant. Depending upon a pressure differential in a compressor of the unit, a pressure differential above a threshold amount can cause a loss of lubricant through a lubricant tank vent conduit which provides a fluid connection between a lubricant tank assembly and an evaporator of the unit. The loss of lubricant to the evaporator can be at a greater rate than lubricant is returned from the evaporator lubricant return system.

SUMMARY

This disclosure is directed to lubricant separation in a heat transfer fluid (e.g., refrigerant) system. More specifically, the disclosure is directed to a device for separating lubricant from a heat transfer fluid in a heat transfer fluid system such as, but not limited to, a vapor compression system. In an embodiment, the heat transfer fluid system is included in a heating, ventilation, and air conditioning (HVAC) system such as, but not limited to, a chiller or the like.

In an embodiment, a lubricant separator can separate a lubricant from a lubricant—heat transfer fluid mixture. In an embodiment, in addition to separating a lubricant from the lubricant—heat transfer fluid mixture, the lubricant separator can reduce a velocity of a heat transfer fluid portion of the mixture exiting the lubricant separator. In an embodiment, the lubricant separator can include a housing and one or more lubricant separating structures on which a lubricant in the lubricant—heat transfer fluid mixture can coalesce. In an embodiment, the lubricant separating structures may be a plurality of vanes. In an embodiment, the plurality of vanes has a geometry which is the same or substantially the same. In an embodiment, the plurality of vanes may be tunable. In such an embodiment, the plurality of vanes may have geometries which are different.

In an embodiment, the housing and the plurality of vanes can be made from any of a variety of materials which are selected to be compatible with a heat transfer fluid and lubricant.

In an embodiment, the lubricant separator can include a plurality of vanes which are disposed on one side of the lubricant separator.

A lubricant separator installable into a lubricant tank assembly of a heating, ventilation, and air conditioning (HVAC) system is disclosed. The lubricant separator includes a housing having a top plate, a bottom plate, and an inlet end plate; a plurality of vanes disposed on each side of the housing, the plurality of vanes having a portion that is disposed within the housing and a portion that is disposed outside the housing, the plurality of vanes extending a height of the housing between the top plate and the bottom plate, a leading edge of a first of the plurality of vanes being disposed at a first distance from an intermediate location on a second of the plurality of vanes, the first and the second of the plurality of vanes being adjacent and the first of the plurality of vanes being downstream of the second of the plurality of vanes, trailing edges of the first and second plurality of vanes being disposed a second distance from each other, wherein the first distance is less than the second distance.

A lubricant tank assembly for a heating, ventilation, and air conditioning (HVAC) system is also disclosed. The lubricant tank assembly includes first and second end plates; a housing extending between the first and second end plates and forming a cavity therein; a conduit that provides an inlet flow of a lubricant—heat transfer fluid mixture to the cavity, wherein the conduit includes a lubricant separator at an end of the conduit that is disposed within the cavity. The lubricant separator includes a housing having a top plate, a bottom plate, and an inlet end plate; and a plurality of vanes disposed on each side of the housing, the plurality of vanes having a portion that is disposed within the housing and a portion that is disposed outside the housing, the plurality of vanes extending a height of the housing between the top plate and the bottom plate, a leading edge of a first of the plurality of vanes being disposed at a first distance from an intermediate location on a second of the plurality of vanes, the first and the second of the plurality of vanes being adjacent and the first of the plurality of vanes being downstream of the second of the plurality of vanes, trailing edges of the first and second plurality of vanes being disposed a second distance from each other, wherein the first distance is less than the second distance.

A method is also disclosed. The method includes directing a fluid into a fluid inlet of a lubricant tank assembly, the fluid including a lubricant—heat transfer fluid mixture; separating the lubricant from the lubricant—heat transfer fluid mixture; discharging the heat transfer fluid through a heat transfer return conduit; and pumping the lubricant from the lubricant tank assembly. Separating the lubricant from the lubricant—heat transfer fluid mixture includes directing the fluid into a lubricant separator having a plurality of vanes, lubricant entrained in the lubricant—heat transfer fluid mixture coalesces on the plurality of vanes, and discharging heat transfer fluid from the housing into the lubricant tank assembly.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure is directed to lubricant separation in a heating, ventilation, and air conditioning (HVAC) system. More specifically, the disclosure is directed to a device for separating lubricant from a heat transfer fluid in an HVAC system such as, but not limited to, a chiller or the like.

A lubricant separator is disclosed. The lubricant separator can cause lubricant which is entrained with a heat transfer fluid (e.g., a lubricant—heat transfer fluid mixture) to coalesce and fall (e.g., via gravity) into a bottom portion of a lubricant tank assembly. The lubricant separator can also reduce a velocity of the lubricant—heat transfer fluid mixture as it enters the lubricant tank assembly. The velocity reduction can, for example, reduce an amount of splashing of the lubricant that occurs as the lubricant—heat transfer fluid mixture enters the lubricant tank assembly. The velocity reduction can, for example, enable lubricant droplets to fall (e.g., via gravity) into the bottom portion of the lubricant tank assembly as the flow of the heat transfer fluid is provided to a heat transfer fluid return conduit of the lubricant tank assembly. That is, the velocity reduction can reduce carryover of lubricant into a component of the heat transfer fluid system (e.g., into an evaporator).

In an embodiment, the lubricant can alternatively be referred to as an oil. Accordingly, the lubricant separator may also be alternatively referred to as an oil separator.

Figure 1:
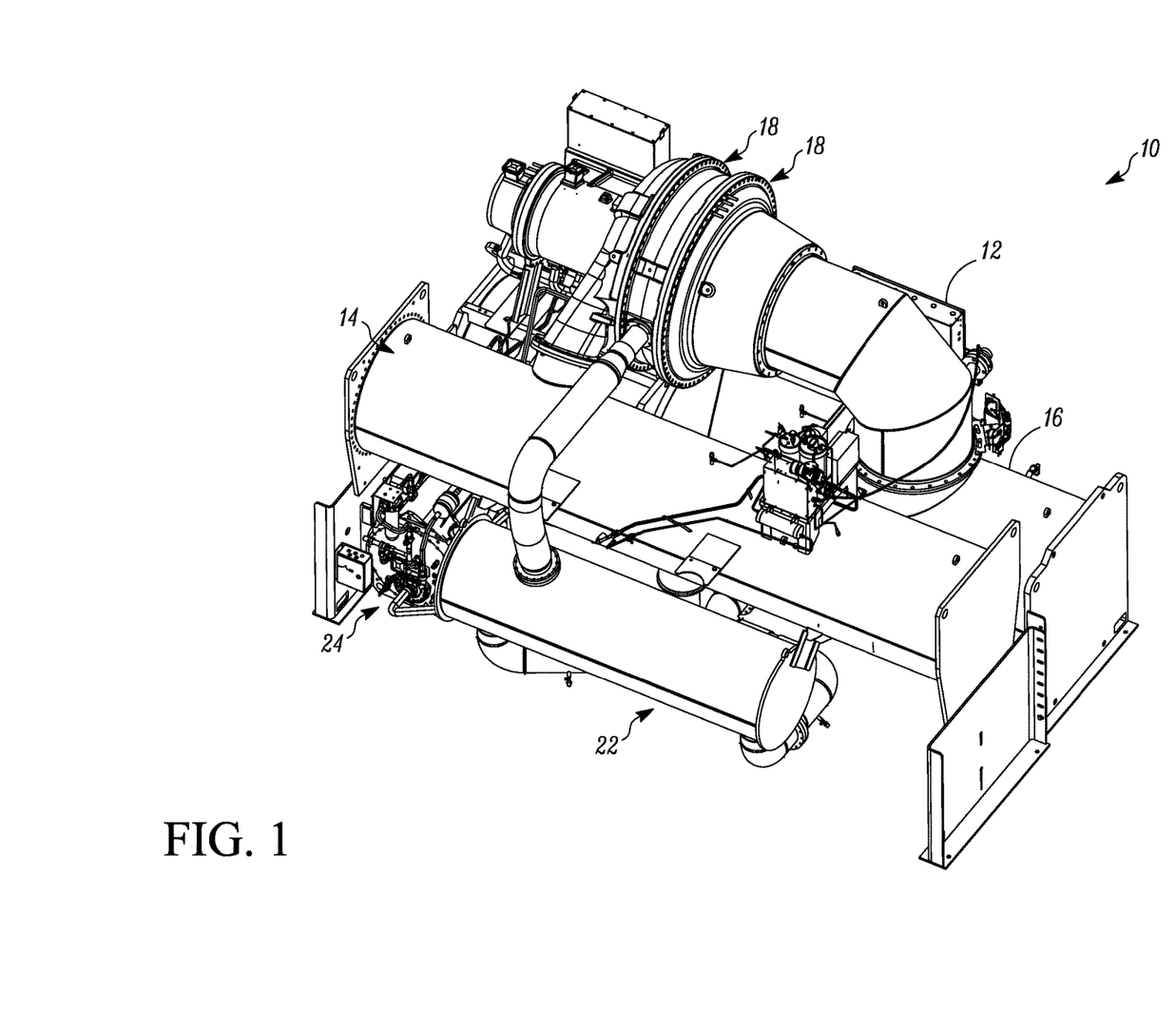
FIG. 1 is a perspective view of a chiller unit of a heating, ventilation, and air conditioning (HVAC) system, according to an embodiment.

FIG. 1 is a perspective view of a chiller unit 10 of a heating, ventilation, and air conditioning (HVAC) system, according to an embodiment.

The chiller unit 10 includes among other features, a compressor 18 fluidly connected to a condenser 14, which is fluidly connected to an evaporator 16 and which is fluidly connected to the compressor 18 for example in a cooling circuit. The chiller unit 10 may also contain an economizer 22 which is fluidly connected to the compressor 18. In an embodiment, the fluid used in the cooling circuit can be a heat transfer fluid such as a refrigerant which is in a heat exchange relationship with one or more fluids, such as, but not limited to, water, to cool or chill the water for other use or applications, such as, but not limited to, in comfort cooling applications.

A two-stage centrifugal compressor 18 is illustrated in the figure. It is to be understood that the compressor 18 can alternatively be a single-stage centrifugal compressor, a three-stage centrifugal compressor, or other suitable multi-stage centrifugal compressor. The disclosed embodiments may also be suitable for other types of compressors. The chiller unit 10 may also include a control system 12 to control operation of the chiller unit 10.

A lubricant tank assembly 24 can be included for managing lubricant. In an embodiment, the lubricant tank assembly 24 can alternatively be referred to as, for example, lubricant sump 24. In general, a lubricant draining from one or more bearings can be returned to the lubricant tank assembly 24 via one or more drain lines. In addition to lubricant, a portion of heat transfer fluid can be provided to the lubricant tank assembly 24. According to an embodiment, a lubricant separator can be included in the lubricant tank assembly 24 in order to improve separation of lubricant and heat transfer fluid so that the lubricant and heat transfer fluid may be reused in the chiller unit 10. In an embodiment, the lubricant separator can reduce an amount of lubricant entrained with the heat transfer fluid which may be vented back to the evaporator 16. In an embodiment, this can reduce an amount of lubricant loss for the chiller unit 10.

Figure 2:
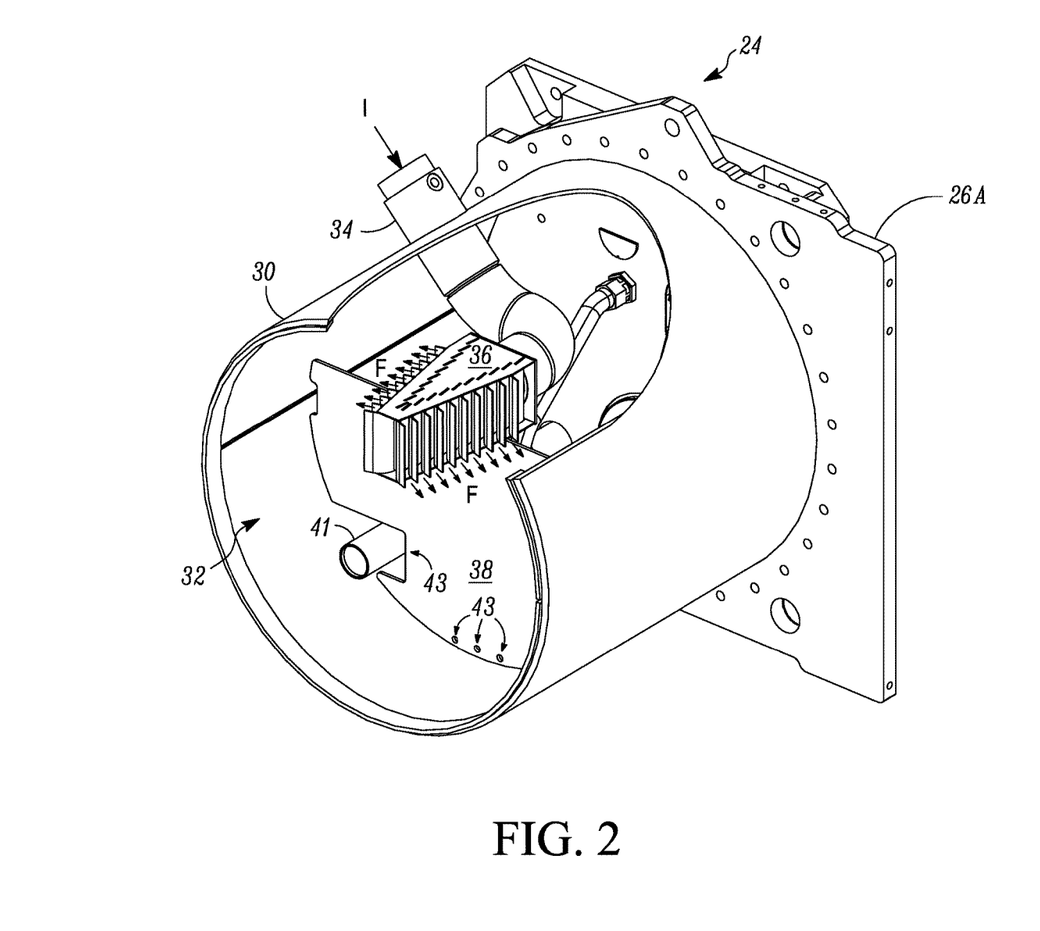
FIG. 2 illustrates a cutaway perspective view of a lubricant tank assembly, according to an embodiment.
Figure 3:
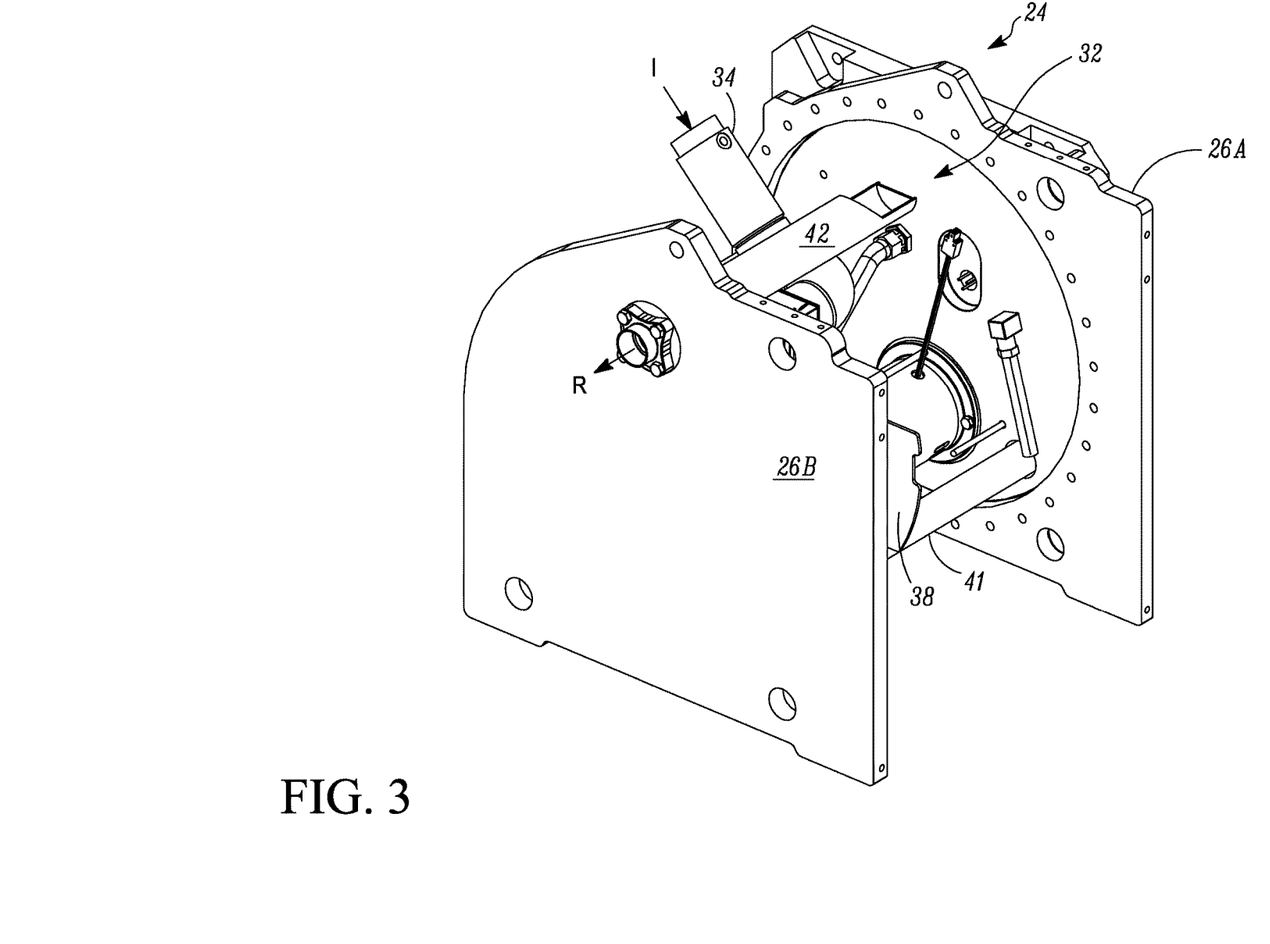
FIG. 3 illustrates a cutaway perspective view of a lubricant tank assembly, according to an embodiment.
Figure 4:
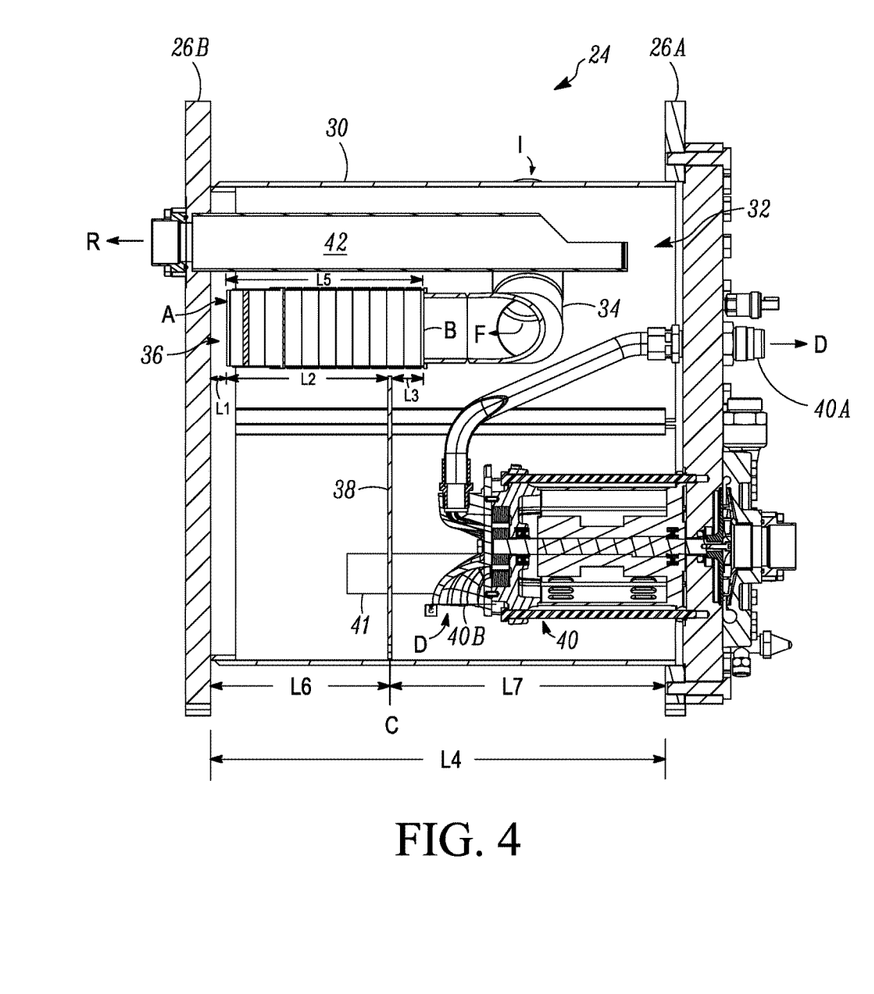
FIG. 4 illustrates a sectional view of a lubricant tank assembly, according to an embodiment.
Figure 5:
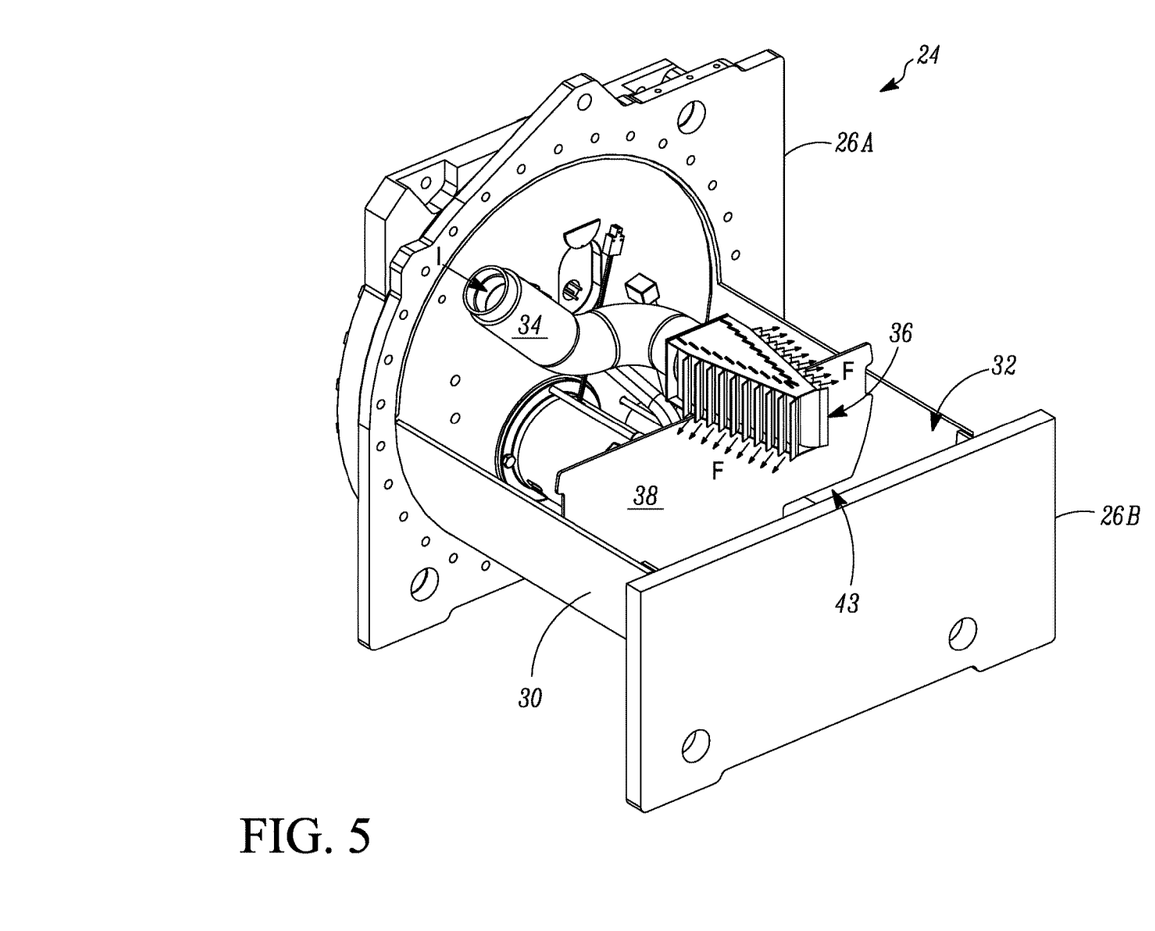
FIG. 5 illustrates a cutaway perspective view of a lubricant tank assembly, according to an embodiment.
Figure 6:
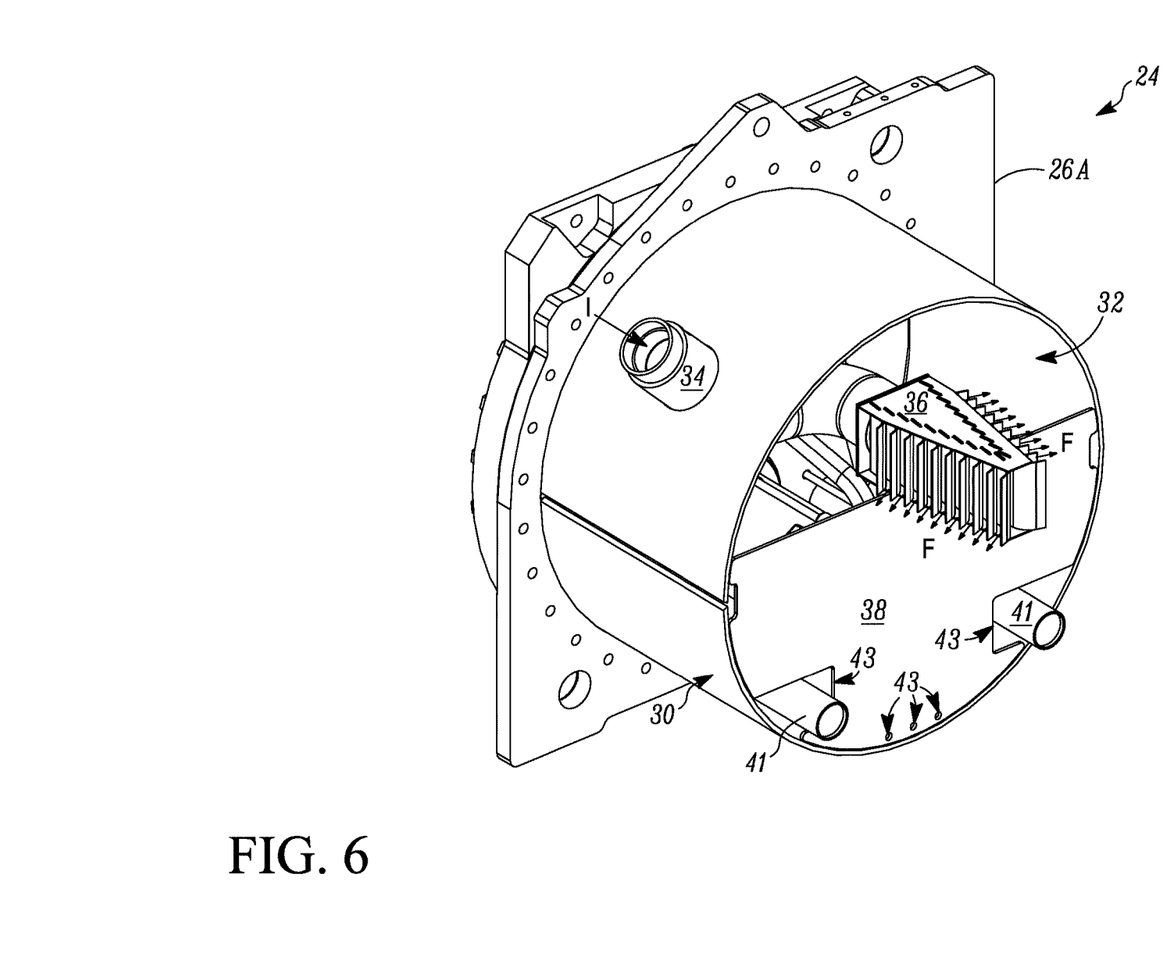
FIG. 6 illustrates a perspective cutaway view of a lubricant tank assembly, according to an embodiment.

FIGS. 2-6 illustrate various views of the lubricant tank assembly 24, according to an embodiment. FIG. 2 illustrates a cutaway perspective view of the lubricant tank assembly 24, according to an embodiment. FIG. 3 illustrates a cutaway perspective view of the lubricant tank assembly 24, according to an embodiment. FIG. 4 illustrates a sectional view of the lubricant tank assembly 24, according to an embodiment. FIG. 5 illustrates a cutaway perspective view of the lubricant tank assembly 24, according to an embodiment. FIG. 6 illustrates a perspective cutaway view of the lubricant tank assembly 24, according to an embodiment. For simplicity of this specification, the features in FIGS. 2-6 will be discussed with general reference to FIGS. 2-6 unless explicitly indicated otherwise.

The lubricant tank assembly 24 includes a plurality of end plates 26A, 26B, defining a length L4 (FIG. 4) of the lubricant tank assembly 24. A housing 30 extends along the length L4 between the end plates 26A, 26B forming a cavity 32 therein. A conduit 34 enters the lubricant tank assembly 24. The conduit 34 is generally representative of a lubricant drain line which is configured to return a lubricant—heat transfer fluid mixture to the lubricant tank assembly 24. In an embodiment, the conduit 34 can alternatively be referred to as the lubricant drain line 34. In the figures, arrow I is generally representative of a flow direction of the lubricant—heat transfer fluid mixture into the lubricant tank assembly 24 via the conduit 34.

The lubricant—heat transfer fluid mixture is provided to a lubricant separator 36. The lubricant separator 36 is shown and described in additional detail in accordance with FIGS. 7-9 below. Generally, the lubricant separator 36 includes a plurality of vanes. As the lubricant—heat transfer fluid mixture flows from the conduit 34 through the lubricant separator 36, a velocity of the lubricant—heat transfer fluid mixture is generally reduced. Accordingly, in an embodiment, the lubricant separator 36 can alternatively be referred to as the lubricant separator and diffuser 36. Lubricant which is entrained with the heat transfer fluid in the lubricant—heat transfer fluid mixture can coalesce on the plurality of vanes as the lubricant—heat transfer fluid mixture flows through the lubricant separator 36. A portion of the lubricant—heat transfer fluid mixture, which generally includes less lubricant than the lubricant—heat transfer fluid mixture which enters the lubricant separator 36, flows from the lubricant separator 36 in an outlet direction F. The lubricant which has coalesced on the plurality of vanes can drain from the plurality of vanes of the lubricant separator 36 and into a lower portion of the cavity 32 via gravity.

The cavity 32 of the lubricant tank assembly 24 is divided by a partition 38. The partition 38 can, for example, be placed between a lubricant pump 40 and the end plate 26B to reduce turbulence of lubricant in the lubricant tank assembly 24 prior to being provided to the lubricant pump 40. In an embodiment, the partition 38 may not be included. The lubricant which has settled in the lower portion of the cavity 32 can be returned, for example, to working parts of the HVAC system such as, but not limited to, bearings of the compressor (e.g., compressor 18 of FIG. 1) and/or other components requiring lubrication in the HVAC system, via the lubricant pump 40 and the lubricant outlet 40A. A flow direction D of lubricant from the lubricant outlet 40A is shown in FIG. 4.

The heat transfer fluid which has been separated from the lubricant—heat transfer fluid mixture can be returned to the heat transfer circuit via a return conduit 42. In an embodiment, the return conduit 42 may be disposed at an opposite end of the housing 30 from the lubricant separator 36. In an embodiment, an inlet of the return conduit 42 may be disposed relatively closer to the end plate 26A than the end plate 26B. Such a location may, for example, provide additional lubricant separation via gravity as the heat transfer fluid travels from the lubricant separator 36 toward the inlet of the return conduit 42. The heat transfer fluid generally flows from the return conduit 42 in a direction R (FIGS. 3-4).

With reference to FIG. 4, the lubricant separator 36 is disposed within lubricant tank assembly 24 such that a distance L1 is maintained between an end A of the lubricant separator 36 and the end plate 26B. In general, the distance L1 can be selected to maximize a length of the lubricant separator 36 and to maintain at least some space between the end A and the end plate 26B. In an embodiment, the end A of the lubricant separator 36 is open. In an embodiment, the end A of the lubricant separator 36 is closed. A portion of the lubricant separator 36 has a length L2 from the partition 38 to outlet end A of the lubricant separator 36. Another portion of the lubricant separator 36 has a length L3 from the partition 38 to inlet end B of the lubricant separator 36. In general, the length L2 is selected to be greater than the length L3. In an embodiment, a location of the partition 38 can be modified such that the portion of the lubricant separator 36 having the length L3 is disposed on a left side of the partition 38 (with respect to the page in FIG. 4). That is, in an embodiment, the lubricant separator 36 may be disposed on a left side of the partition 38. An overall length L5 of the lubricant separator 36 is, therefore, a sum of the lengths L2 and L3. The overall length L5 of the lubricant separator 36 may be dependent upon a particular application in which the lubricant separator 36 is to be installed. For example, a capacity of the chiller unit 10 may impact an overall length L5 of the lubricant separator 36. In an embodiment, an effectiveness of the lubricant separator 36 (e.g., amount of lubricant separated) may be increased as the length L5 increases.

In an embodiment, the lubricant separator 36 is disposed in an upper portion of the cavity 32 within the housing 30. In such an embodiment, the lubricant separator 36 can be disposed at a vertical height of the housing 30 that is relatively higher than a middle of the housing 30. This location can, for example, allow a lubricant portion of the lubricant—heat transfer fluid mixture that is separated to fall (via gravity) to the lower portion of the cavity 32. In an embodiment, the lubricant separator 36 is disposed so that a bottom side of the lubricant separator 36 is maintained above a lubricant level in the cavity 32. In an embodiment, the lubricant separator 36 is disposed so that a bottom side of the lubricant separator 36 is maintained above the partition 38. In general, the partition 38 may be disposed such that an end of the partition 38 is disposed vertically above the lubricant level in the cavity 32.

The partition 38 is disposed a length L6 from the end plate 26B and a length L7 from the end plate 26A at a location C. In general, the length L6 is relatively smaller than the length L7. That is, the location C, and accordingly the partition 38, are disposed relatively closer to the end plate 26B than to the end plate 26A. In an embodiment, the lengths L6 and L7 can be at or about the same. In an embodiment, the length L6 can be increased such that the partition 38 is moved relatively closer to an inlet 40B of the lubricant pump 40. The partition 38 includes a plurality of apertures 43 which enable a flow of lubricant between the two sides of the partition 38 such that lubricant which drops from the lubricant separator 36 is provided to the lubricant pump 40.

In an embodiment, the lubricant tank assembly 24 includes one or more heaters 41. The one or more heaters 41 can, for example, maintain a desired temperature of the lubricant. In an embodiment, the desired temperature of the lubricant may be a temperature at which the amount of heat transfer fluid absorbed by the lubricant is reduced. In an embodiment, the one or more heaters 41 may be enabled when the chiller unit 10 (FIG. 1) is operative and/or when the chiller unit 10 is inoperative.

Figure 7:
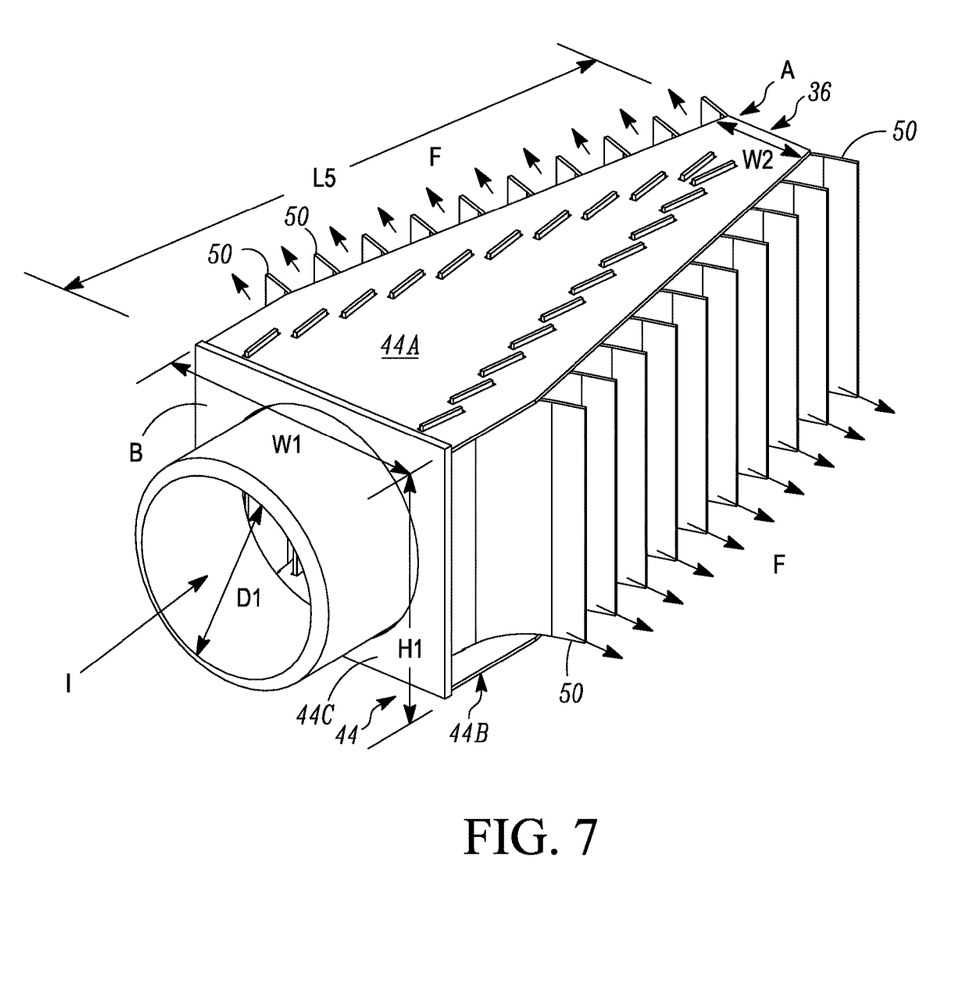
FIG. 7 shows a perspective view of a lubricant separator, according to an embodiment.
Figure 8:
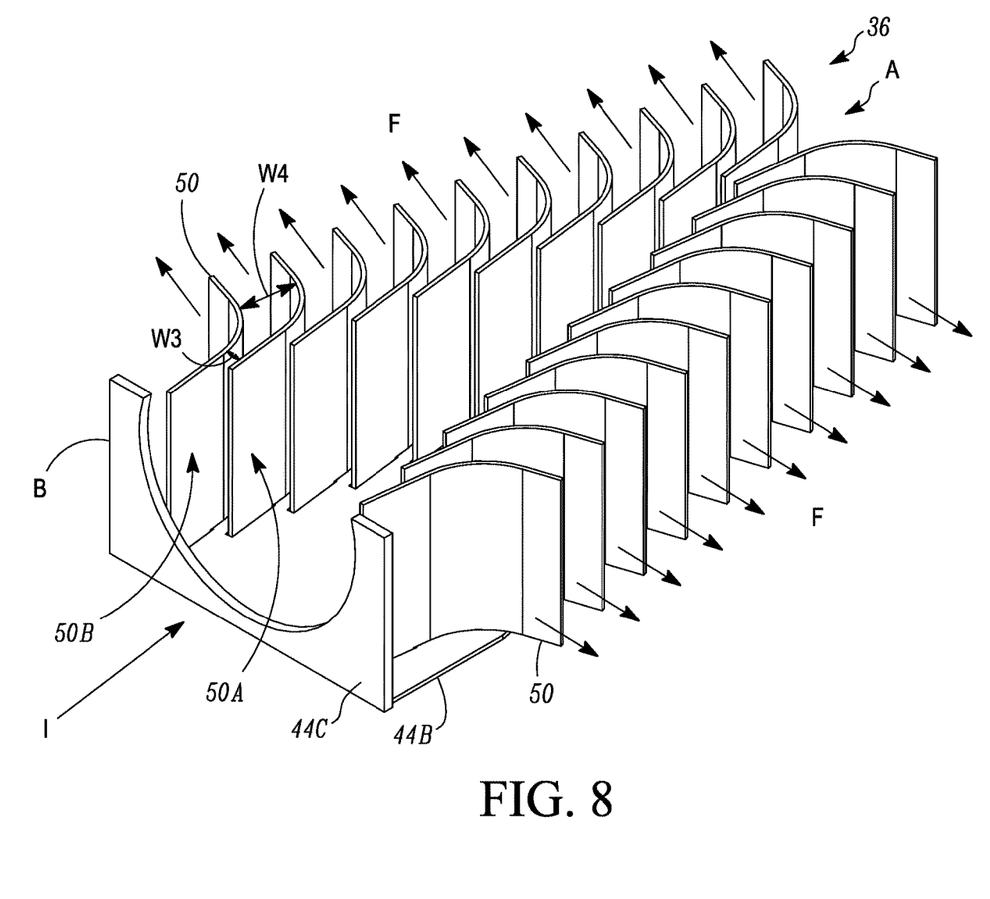
FIG. 8 shows a perspective cutaway view of a lubricant separator, according to an embodiment.
Figure 9:
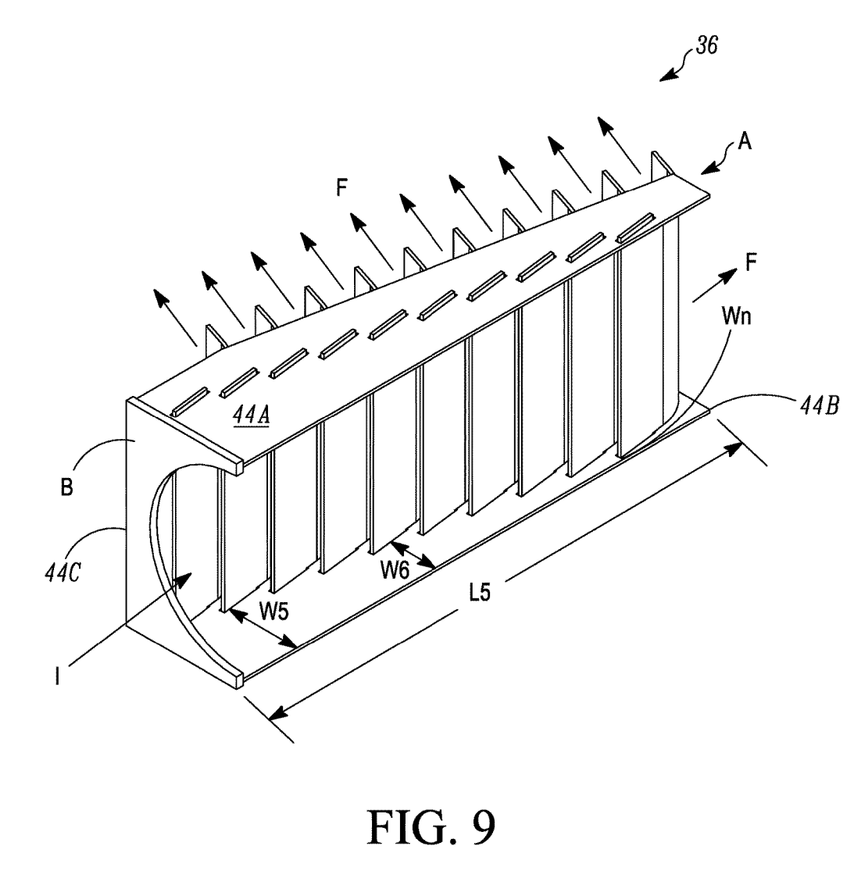
FIG. 9 shows a perspective cutaway view of a lubricant separator, according to an embodiment.

FIGS. 7-9 illustrate a variety of views of the lubricant separator 36, according to an embodiment. FIG. 7 shows a perspective view of the lubricant separator 36, according to an embodiment. FIG. 8 shows a perspective cutout view of the lubricant separator 36, according to an embodiment. FIG. 9 shows a perspective cutout view of the lubricant separator 36, according to an embodiment. For simplicity of this specification, the features in FIGS. 7-9 will be discussed with general reference to FIGS. 7-9 unless explicitly indicated otherwise.

The lubricant separator 36 includes a housing 44. In an embodiment, the housing 44 can be generally trapezoidal in geometry. It will be appreciated that the geometry of the housing 44 can vary. For example, in an embodiment the housing 44 can be generally triangular in geometry. In an embodiment, the lubricant separator 36 can be symmetrical. In general, the housing 44 has a first width w1 at the inlet end B of the lubricant separator 36 and a second width w2 at the end A of the lubricant separator 36 that is opposite the inlet end B. The width w2 is generally less than the width w1. The housing 44 generally decreases gradually in width from the first width w1 at the inlet end B of the lubricant separator 36 to the second width w2 at the outlet end A of the lubricant separator 36. The housing 44 has a height H1. In an embodiment, the height H1 can be substantially constant between the end B and the end A. In an embodiment, the housing 44 can be formed of a top plate 44A, a bottom plate 44B spaced the height H1 from the top plate 44A, and an end plate 44C forming end B. In an embodiment, the housing 44 can also include an end plate (not shown) forming end A. In such an embodiment, sides of the housing 44 between the top plate 44A and the bottom plate 44B may be open.

A plurality of vanes 50 can be disposed on at least one side of the housing 44, thereby forming a plurality of openings in which the heat transfer fluid can flow from the housing 44 in the flow direction F. In the illustrated embodiment, the plurality of vanes 50 are disposed on both sides of the housing 44. It will be appreciated that the heat transfer fluid flowing from the housing 44 can also include some lubricant which was not separated from the lubricant—heat transfer fluid mixture.

In an embodiment, the plurality of vanes 50 can have a geometry that is the same or substantially the same. In an embodiment, the plurality of vanes 50 can be tuned based on, for example, desired flow conditions or the like. In such an embodiment, one or more of the plurality of vanes 50 may be geometrically the same or substantially the same and one or more of the plurality of vanes 50 can be different. In an embodiment in which the plurality of vanes are tuned, a relative thickness of one of the plurality of vanes 50 between a leading edge and a trailing edge of the one of the plurality of vanes 50 may be varied. In an embodiment, the plurality of vanes can be tuned by varying an overall length of the vanes, a relative angle at which the outlet flow F is directed relative to the inlet flow I, or the like. In an embodiment, a spacing between the plurality of vanes 50 can vary (e.g., varying a distance w3 or w4, as described below). In an embodiment, a contour or curvature of the plurality of vanes 50 can be varied. The leading edges of the plurality of vanes 50 are edges of the plurality of vanes 50 which are disposed in an interior of the housing 44 and receive the inlet flow I. The trailing edges of the plurality of vanes 50 are edges of the plurality of vanes 50 which are opposite the leading edges and are generally at an outlet of the flow F.

The lubricant separator 36 is designed such that the lubricant—heat transfer fluid mixture which enters the lubricant separator 36 is reduced in velocity. In an embodiment, this can be accomplished by diffusing the inlet flow I. In an embodiment, a cross-sectional area through which the outlet flow F is provided may be about 2-3 times greater than a cross-sectional area of the conduit 34. In general, a velocity of the outlet flow F is a function of the velocity of the inlet flow I. The velocity of the outlet flow F can be about the same regardless of the relative location along the length L5 of the lubricant separator 36.

A lubricant—heat transfer fluid mixture enters the lubricant separator 36 via the conduit 34 in the flow direction I. The lubricant—heat transfer fluid mixture collides with the plurality of vanes 50. Lubricant may coalesce on the plurality of vanes 50. As can be seen in FIGS. 7-8, because a portion of each of the plurality of vanes 50 is disposed relatively outside the housing 44, the lubricant which coalesces can fall (via gravity) and be provided to a lower portion of the cavity 32 of the housing 30. The heat transfer fluid can flow outwardly from the housing 44 in the outlet flow direction F. In an embodiment, the lubricant separator 36 may be most effective (e.g., a relatively higher amount of lubricant separated) at or about a middle section of the lubricant separator 36. In an embodiment, the effectiveness may be because at a portion on the inlet side of the lubricant separator 36, relatively less fluid may be diverted through the plurality of vanes 50. Further, toward end A of the lubricant separator 36, a relatively larger portion of the fluid mixture may have already been diverted through the plurality of vanes 50 in the middle portion.

The plurality of vanes 50 are arranged such that a distance w3 between a leading edge of a first of the plurality of vanes 50 (e.g., vane 50A in FIG. 8) and an intermediate location on a second of the plurality of vanes 50 (e.g., vane 50B in FIG. 8) which is upstream of the first of the plurality of vanes 50 is relatively smaller than a distance w4 between trailing edges of the first vane 50A and the second vane 50B. In an embodiment, the distances w3 and w4 are formed by a line that is perpendicular to surfaces of the first vane 50A and the second vane 50B that are facing each other. The distance w3 is generally smaller than the distance w4. These distances can be selected to control a flow rate of the lubricant—heat transfer fluid mixture. The intermediate location is a location at which the second vane 50B overlaps with the first vane 50A. Upstream generally refers to a location which is relatively closer to the inlet end B of the lubricant separator 36 than the outlet end A. Downstream generally refers to a location which is relatively closer to the outlet end A of the lubricant separator 36 than the inlet end B.

The plurality of vanes 50 is disposed such that a leading edge of the vanes is a particular distance from the middle point of the housing 44. For example, the vanes can be disposed at distances w5 . . . w6 . . . wn. In general, the distance w5, which is disposed relatively closer to the inlet end B, is relatively greater than the distance w6 of the vane that is disposed relatively farther from the inlet end B. As the width w2 is relatively smaller than the width w1, the widths w5 . . . w6 . . . wn generally decrease from the inlet end B of the housing 44 to the outlet end A.

Aspects:

It is noted that any one of aspects 1-9 can be combined with any one of aspects 10-18 and any one of aspects 19-20. Any one of aspects 10-18 can be combined with any one of aspects 19-20.

Aspect 1. A lubricant separator installable into a lubricant tank assembly of a heating, ventilation, and air conditioning (HVAC) system, comprising:
 a housing having a top plate, a bottom plate, and an inlet end plate; and
 a plurality of vanes disposed on at least one side of the housing, the plurality of vanes having a portion that is disposed within the housing, the plurality of vanes extending a height of the housing between the top plate and the bottom plate, a leading edge of a first of the plurality of vanes being disposed at a first distance from an intermediate location on a second of the plurality of vanes, the first and the second of the plurality of vanes being adjacent and the first of the plurality of vanes being downstream of the second of the plurality of vanes, trailing edges of the first and second plurality of vanes being disposed a second distance from each other, wherein the first distance is less than the second distance.

Aspect 2. The lubricant separator according to aspect 1, wherein each of the plurality of vanes has a same geometry.

Aspect 3. The lubricant separator according to any one of aspects 1-2, wherein the housing is trapezoidal in cross-section.

Aspect 4. The lubricant separator according to any one of aspects 1-3, wherein an inlet end of the lubricant separator is wider than an outlet end of the lubricant separator.

Aspect 5. The lubricant separator according to any one of aspects 1-4, wherein the lubricant separator is made of a material that is compatible with a heat transfer fluid for the HVAC system.

Aspect 6. The lubricant separator according to any one of aspects 1-5, wherein a distance of the leading edges from a midpoint of the housing decreases along a length of the housing.

Aspect 7. The lubricant separator according to any one of aspects 1-6, wherein the plurality of vanes are disposed on both sides of the housing.

Aspect 8. The lubricant separator according to any one of aspects 1-7, wherein the housing is open at an outlet end.

Aspect 9. The lubricant separator according to any one of aspects 1-8, wherein a portion of the plurality of vanes is disposed outside the housing.

Aspect 10. A lubricant tank assembly for a heating, ventilation, and air conditioning (HVAC) system, comprising:
 first and second end plates;
 a tank housing extending between the first and second end plates and forming a cavity therein; and
 a conduit that provides an inlet flow of a lubricant—heat transfer fluid mixture to the cavity, wherein the conduit includes a lubricant separator at an end of the conduit that is disposed within the cavity, the lubricant separator including:
   a housing having a top plate, a bottom plate, and an inlet end plate;
   a plurality of vanes disposed on at least one side of the housing, the plurality of vanes having a portion that is disposed within the housing, the plurality of vanes extending a height of the housing between the top plate and the bottom plate, a leading edge of a first of the plurality of vanes being disposed at a first distance from an intermediate location on a second of the plurality of vanes, the first and the second of the plurality of vanes being adjacent and the first of the plurality of vanes being downstream of the second of the plurality of vanes, trailing edges of the first and second plurality of vanes being disposed a second distance from each other, wherein the first distance is less than the second distance.

Aspect 11. The lubricant tank assembly according to aspect 10, further comprising a drain conduit for receiving a lubricant, the drain conduit disposed in bottom portion of the cavity.

Aspect 12. The lubricant tank assembly according to any one of aspects 10-11, further comprising a heat transfer fluid return conduit.

Aspect 13. The lubricant tank assembly according to any one of aspects 10-12, further comprising a partition disposed between the first and second end plates.

Aspect 14. The lubricant tank assembly according to any one of aspects 10-13, wherein the lubricant separator is disposed in an upper portion of the cavity.

Aspect 15. The lubricant tank assembly according to any one of aspects 10-14, wherein the lubricant tank assembly is fluidly connected to one or more components of the HVAC system which require lubrication.

Aspect 16. The lubricant tank assembly according to any one of aspects 10-15, wherein the heat transfer fluid return conduit is fluidly connected to an evaporator of the HVAC system.

Aspect 17. The lubricant tank assembly according to any one of aspects 10-16, wherein the plurality of vanes includes a portion that is disposed outside the housing Aspect 18. A chiller unit including the lubricant tank assembly according to any one of aspects 10-17.

Aspect 19. A method, comprising:
directing a fluid into a fluid inlet of a lubricant tank assembly, the fluid including a lubricant—heat transfer fluid mixture;
separating the lubricant from the lubricant—heat transfer fluid mixture, wherein the separating includes:
directing the fluid into a lubricant separator having a plurality of vanes, wherein lubricant entrained in the lubricant—heat transfer fluid mixture coalesces on the plurality of vanes, and
discharging heat transfer fluid from the housing into the lubricant tank assembly; discharging the heat transfer fluid through a heat transfer return conduit; and pumping the lubricant from the lubricant tank assembly.

Aspect 20. The method according to aspect 19, wherein discharging the heat transfer fluid from the housing includes reducing a velocity of the heat transfer fluid.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are examples, with the true scope and spirit of the disclosure being indicated by the claims that follow.

What is claimed is:

1. A lubricant separator installable into a lubricant tank assembly of a heating, ventilation, and air conditioning (HVAC) system, comprising:
a housing having a top plate, a bottom plate, and an inlet end plate, the housing having an inlet end and an outlet end; and
a plurality of vanes disposed on at least one side of the housing, the plurality of vanes having a portion that is disposed within the housing, the plurality of vanes extending a height of the housing between the top plate and the bottom plate, a leading edge of a first of the plurality of vanes being disposed at a first distance from an intermediate location on a second of the plurality of vanes, the first and the second of the plurality of vanes being adjacent and the first of the plurality of vanes being downstream of the second of the plurality of vanes, trailing edges of the first and second plurality of vanes being disposed a second distance from each other, wherein the first distance is less than the second distance,
wherein the outlet end is disposed at a lengthwise extent of the top plate and the bottom plate of the housing, and the outlet end of the housing is open such that a fluid can flow out from the outlet end.

2. The lubricant separator according to claim 1, wherein each of the plurality of vanes has a same geometry.

3. The lubricant separator according to claim 1, wherein the housing is trapezoidal in cross-section.

4. The lubricant separator according to claim 1, wherein the inlet end of the lubricant separator is wider than the outlet end of the lubricant separator.

5. The lubricant separator according to claim 1, wherein a distance of the leading edges from a midpoint of the housing decreases along a length of the housing.

6. The lubricant separator according to claim 1, wherein the plurality of vanes are disposed on both sides of the housing.

7. The lubricant separator according to claim 1, wherein a portion of the plurality of vanes is disposed outside the housing.

8. The lubricant separator according to claim 1, wherein the top plate includes an inlet end and an outlet end, and the bottom plate includes an inlet end and an outlet end,
the outlet end of the top plate is disposed at the lengthwise extent opposite the inlet end of the top plate,
the outlet end of the bottom plate is disposed at the lengthwise extent opposite the inlet end of the bottom plate, and
an open plane extending from the outlet end of the top plate to the outlet end of the bottom plate defines the outlet end of the housing.

9. A lubricant tank assembly for a heating, ventilation, and air conditioning (HVAC) system, comprising:
first and second end plates;
a tank housing extending between the first and second end plates and forming a cavity therein;
and a conduit that provides an inlet flow of a lubricant and heat transfer fluid mixture to the cavity, wherein the conduit includes a lubricant separator at an end of the conduit that is disposed within the cavity, the lubricant separator including: a housing having a top plate, a bottom plate, and an inlet end plate, the housing having an inlet end and an outlet end; a plurality of vanes disposed on at least one side of the housing, the plurality of vanes having a portion that is disposed within the housing, the plurality of vanes extending a height of the housing between the top plate and the bottom plate, a leading edge of a first of the plurality of vanes being disposed at a first distance from an intermediate location on a second of the plurality of vanes, the first and the second of the plurality of vanes being adjacent and the first of the plurality of vanes being downstream of the second of the plurality of vanes, trailing edges of the first and second plurality of vanes being disposed a second distance from each other, wherein the first distance is less than the second distance, wherein the outlet end is disposed at a lengthwise extent of the top plate and the bottom plate of the housing, and the outlet end of the housing is open such that a fluid can flow out from the outlet end.

10. The lubricant tank assembly according to claim 9, further comprising a drain conduit for receiving a lubricant, the drain conduit disposed in a bottom portion of the cavity.

11. The lubricant tank assembly according to claim 9, further comprising a heat transfer fluid return conduit.

12. The lubricant tank assembly according to claim 9, further comprising a partition disposed between the first and second end plates.

13. The lubricant tank assembly according to claim 9, wherein the lubricant separator is disposed in an upper portion of the cavity.

14. The lubricant tank assembly according to claim 9, wherein the lubricant tank assembly is fluidly connected to one or more components of a heating, ventilation, and air conditioning system which require lubrication.

15. The lubricant tank assembly according to claim 9, wherein the heat transfer fluid return conduit is fluidly connected to an evaporator of a heating, ventilation, and air conditioning system.

16. The lubricant tank assembly according to claim 9, wherein the plurality of vanes includes a portion that is disposed outside the housing.

17. A chiller unit including the lubricant tank assembly according to claim 9.

18. A method, comprising: directing a fluid into a fluid inlet of a lubricant tank assembly, the fluid including a lubricant and heat transfer fluid mixture;
    separating the lubricant from the lubricant and heat transfer fluid mixture, wherein the separating includes:
    directing the fluid into a lubricant separator having a plurality of vanes, wherein lubricant entrained in the lubricant and heat transfer fluid mixture coalesces on the plurality of vanes, and
    discharging the heat transfer fluid from the housing into the lubricant tank assembly, including discharging the heat transfer fluid out from an outlet end of the housing, the outlet end being disposed at a lengthwise extent of the housing, the outlet end of the housing being open;
    discharging the heat transfer fluid through a heat transfer return conduit; and
    pumping the lubricant from the lubricant tank assembly.

19. The method according to claim 18, wherein discharging the heat transfer fluid from the housing includes reducing a velocity of the heat transfer fluid.

* * * * *